(12) United States Patent
Yoo et al.

(10) Patent No.: US 8,839,136 B2
(45) Date of Patent: Sep. 16, 2014

(54) METHOD OF CONTROLLING VIRTUAL OBJECT OR VIEW POINT ON TWO DIMENSIONAL INTERACTIVE DISPLAY

(75) Inventors: Byung In Yoo, Seoul (KR); Chang Kyu Choi, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 731 days.

(21) Appl. No.: 12/453,352

(22) Filed: May 7, 2009

(65) Prior Publication Data

US 2010/0146389 A1 Jun. 10, 2010

(30) Foreign Application Priority Data

Dec. 10, 2008 (KR) ........................ 10-2008-0125147

(51) Int. Cl.
*G06F 3/048* (2013.01)
*G06F 3/033* (2013.01)
*G06F 3/0488* (2013.01)
*G06F 3/0481* (2013.01)

(52) U.S. Cl.
CPC .. *G06F 3/04815* (2013.01); *G06F 2203/04808* (2013.01); *G06F 3/04883* (2013.01)
USPC ........... 715/773; 715/848; 715/850; 715/852; 715/863

(58) Field of Classification Search
USPC ......................................... 715/702, 757, 781
See application file for complete search history.

(56) References Cited

U.S. PATENT DOCUMENTS

| | | | | |
|---|---|---|---|---|
| 5,825,352 | A | * | 10/1998 | Bisset et al. ................... 345/173 |
| 8,400,449 | B1 | * | 3/2013 | Davidson ....................... 345/419 |
| 2006/0026536 | A1 | * | 2/2006 | Hotelling et al. .............. 715/863 |
| 2006/0161871 | A1 | | 7/2006 | Hotelling et al. |
| 2007/0061726 | A1 | * | 3/2007 | Rahn et al. ..................... 715/719 |
| 2008/0036776 | A1 | | 2/2008 | Niles et al. |
| 2008/0211779 | A1 | * | 9/2008 | Pryor ............................. 345/173 |
| 2009/0249236 | A1 | * | 10/2009 | Westerman et al. .......... 715/765 |
| 2009/0256817 | A1 | * | 10/2009 | Perlin et al. .................... 345/174 |
| 2009/0259967 | A1 | * | 10/2009 | Davidson et al. ............. 715/799 |
| 2009/0273575 | A1 | * | 11/2009 | Pryor ............................. 345/173 |
| 2009/0278812 | A1 | * | 11/2009 | Yasutake ........................ 345/173 |
| 2010/0044121 | A1 | * | 2/2010 | Simon et al. ............... 178/18.03 |
| 2010/0050133 | A1 | * | 2/2010 | Nishihara et al. ............. 715/863 |
| 2010/0097342 | A1 | * | 4/2010 | Simmons et al. ............. 345/174 |

FOREIGN PATENT DOCUMENTS

| | | |
|---|---|---|
| JP | 11-137842 | 5/1999 |
| JP | 2008-113762 | 5/2008 |
| KR | 10-2006-0059265 | 6/2006 |
| KR | 10-2007-0039613 | 4/2007 |

* cited by examiner

*Primary Examiner* — Stephen Alvesteffer
(74) *Attorney, Agent, or Firm* — Staas & Halsey LLP

(57) ABSTRACT

A method of controlling a viewpoint of a user or a virtual object on a two-dimensional (2D) interactive display is provided. The method may convert a user input to at least 6 degrees of freedom (DOF) structured data according to a number of touch points, a movement direction thereof, and a rotation direction thereof. Any one of the virtual object and the viewpoint of the user may be determined as a manipulation target based on a location of the touch point.

19 Claims, 8 Drawing Sheets

FIG. 3
310: 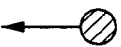 : ZOOM IN (X AXIS)
320: 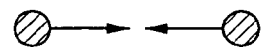 : ZOOM OUT (X AXIS)
330:  : MOVE LEFT (Y AXIS)
340: 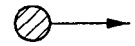 : MOVE RIGHT (Y AXIS)
350: 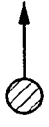 : MOVE UP (Z AXIS)
360:  : MOVE DOWN (Z AXIS)

METHOD OF CONTROLLING VIRTUAL OBJECT OR VIEW POINT ON TWO DIMENSIONAL INTERACTIVE DISPLAY

CROSS-REFERENCE TO RELATED APPLICATIONS

This application claims the priority benefit of Korean Patent Application No. 10-2008-0125147, filed on Dec. 10, 2008, in the Korean Intellectual Property Office, the disclosure of which is incorporated herein by reference.

BACKGROUND

1. Field

One or more exemplary embodiments relate to a technology that may control a virtual object or a viewpoint of a user on a two-dimensional (2D) display.

2. Description of the Related Art

Various types of interfaces may be used for a computing system. For example, a mouse may recognize a user's gestures such as a selection, a paging, a scrolling, and the like, and provide the computing system with data corresponding to the recognized gestures.

The user may move the mouse, or click on a mouse button using a hand, with viewing a mouse cursor on a displayed screen. This mouse may be evaluated as an unintuitive interface for the user.

Current interface technologies are generally focused on how to enhance a mutual relationship between the user and a computer. Specifically, many users desire to manipulate a virtual object and the like, displayed on the screen, using an intuitive interface.

In this circumstance, many users have increasing interests in a touch screen as a more intuitive interface rather than a keyword or the mouse. In particular, since an interface associated with the touch screen uses a multi-touch technology using at least two touch points, it is possible to enhance a user convenience.

SUMMARY

According to an aspect of one or more exemplary embodiments, there may be provided a method of controlling a virtual object or a viewpoint of a user on a two-dimensional (2D) interactive display, the method including: displaying a virtual manipulation medium as a user interface to manipulate the virtual object, displayed on a screen, or the viewpoint of the user; determining, as a manipulation target, any one of the virtual object and the viewpoint of the user, based on a touch point by a user input; converting the user input to at least 6 degrees of freedom (DOF) structured data according to a number of touch points, a movement direction thereof, and a rotation direction thereof; and controlling the manipulation target using the at least 6DOF structured data.

According to another aspect of one or more exemplary embodiments, there may be provided a method of processing multi-touch structured data, the method including: receiving, from a multi-touch driver, the multi-touch structured data that is associated with a user input via a virtual manipulation medium; extracting, from the multi-touch structured data, a number of touch points, a movement direction thereof, a location thereof, and a rotation direction thereof; and converting the multi-touch structured data to at least 6DOF structured data, based on the number of touch points, the movement direction thereof, the location thereof, and the rotation direction thereof.

According to still another aspect of one or more exemplary embodiments, there may be provided a method of processing a virtual manipulation medium that is used to control a virtual object or a viewpoint of a user on an interactive display, the method including: receiving, from a user input via the virtual manipulation object, at least 6DOF structured data, wherein the at least 6DOF structured data is generated based on a number of touch points, a movement direction thereof, a location thereof, and a rotation direction thereof; determining, as a manipulation target, any one of the virtual object, displayed on a screen, and the viewpoint of the user, based on the location of the touch point; displaying, as a user interface, the virtual manipulation medium in any one of a region including the virtual object and a region excluding the virtual object, depending on which one between the virtual object and the viewpoint of the user is determined as the manipulation target; and applying a video effect or an audio effect to the manipulation target that is any one of the virtual object and the viewpoint of the user.

Additional aspects of exemplary embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description, taken in conjunction with the accompanying drawings of which:

FIG. 3 illustrates a change in a virtual object or a viewpoint corresponding to a number of touch points, occurring due to a user gesture, and a movement direction thereof according to an exemplary embodiment;

DETAILED DESCRIPTION

Figure 1:
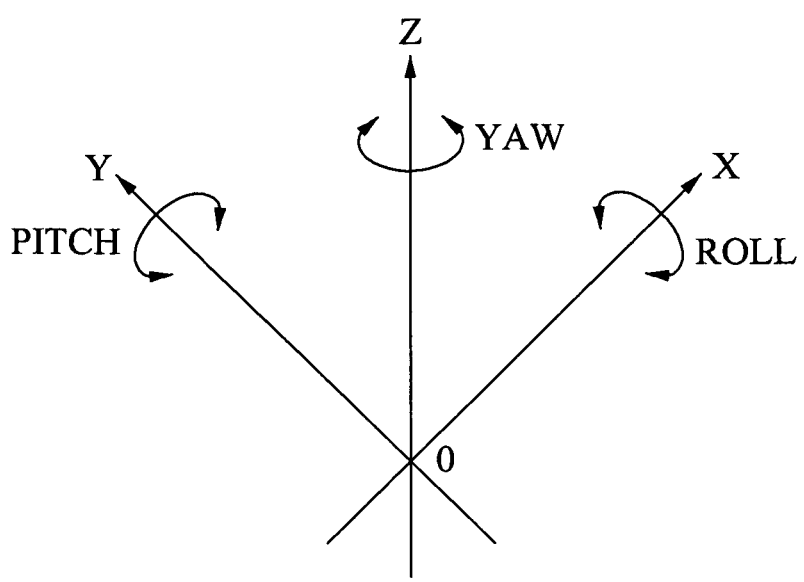
FIG. 1 illustrates 6 degrees of freedom (DOF) in association with a manipulation on a virtual object or a viewpoint of a user according to an exemplary embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 illustrates 6 degrees of freedom (DOF) in association with a manipulation on a virtual object or a viewpoint of a user according to an exemplary embodiment.

Referring to FIG. 1, a motion of the virtual object, displayed on a screen, and a change in the viewpoint of the user may be expressed as 6DOF in a three-dimensional (3D) graphic. In this instance, the change in the viewpoint of the user may correspond to a motion of a camera.

The 6DOF may include a movement along an X axis, a movement along a Y axis, a movement along a Z axis, a roll based on the X axis, a pitch based on the Y axis, and a yaw based on the Z axis.

Specifically, the user may need to exhibit 12 distinct gestures in order to exactly move the virtual object or change the viewpoint in the 3D graphic. A computing system may need to appropriately recognize the 12 distinct gestures.

Figure 2:
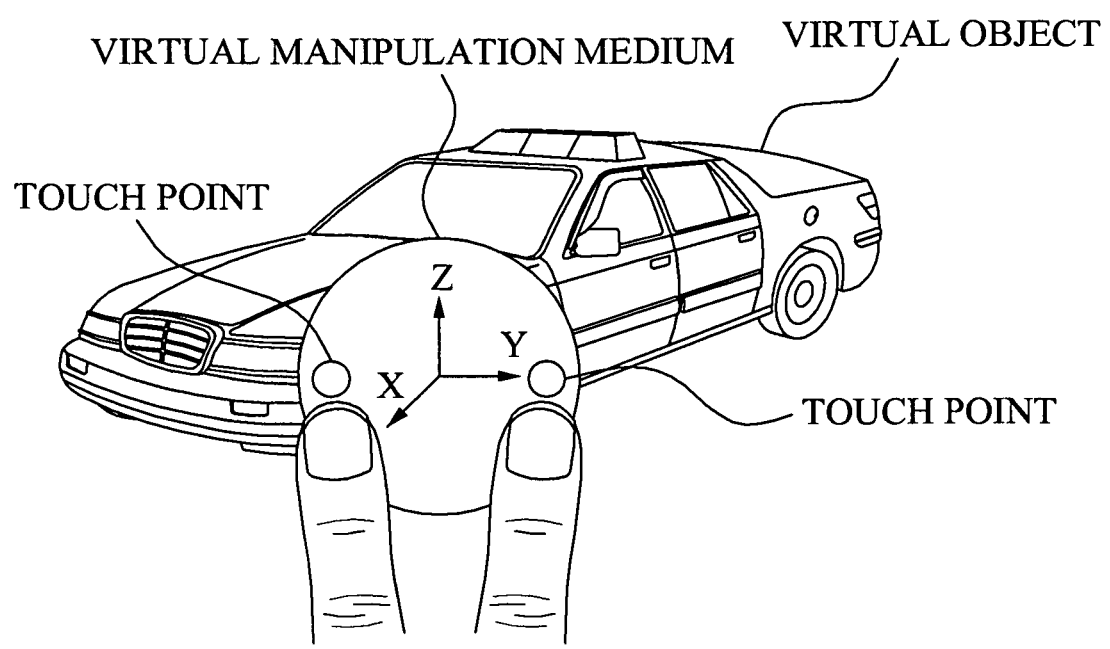
FIG. 2 illustrates a virtual object and a virtual manipulation medium displayed on a screen according to an exemplary embodiment.

FIG. 2 illustrates a virtual object and a virtual manipulation medium displayed on a screen according to an exemplary embodiment.

Referring to FIG. 2, the virtual manipulation medium, used as a user interface, may have a spherical form. Here, a diameter of the virtual manipulation medium may be determined based on a distance between two fingers. In addition to the spherical form, the virtual manipulation medium may have various types of forms. The size and design of the virtual manipulation medium may be diversified. Also, 3D coordinate axes may be displayed on the virtual manipulation medium for a user convenience.

When the user places the user's two fingers on an automobile corresponding to the virtual object in order to manipulate the automobile, the virtual manipulation medium may be displayed above the virtual object. Also, when the user places the user's two fingers on a background in order to manipulate the viewpoint, the virtual manipulation medium may be displayed on the screen. Here, due to the two fingers of the user, touch points may occur on a touch screen.

The user may manipulate the virtual object, or may change the viewpoint using the virtual manipulation medium. For example, in order to generate a single touch point, the user may move the virtual object or a camera by placing one finger on the virtual object or the background and then moving the finger along a Y axis or a Z axis. In order to generate two touch points, the user may place two fingers on the virtual object or the background and then move the virtual object or the camera along a rotation direction. Descriptions related thereto will be made in detail later.

According to an exemplary embodiment, the user may more intuitively manipulate the virtual object or the viewpoint by directly applying a user input on the screen using the virtual manipulation medium. Also, the user may determine, as a manipulation target, any one of the virtual object and the viewpoint, based on a location of the virtual manipulation medium or a location of the touch point, without a need for an additional operation. Through this, the user may more conveniently select the manipulation target.

FIG. 3 illustrates a change in a virtual object or a viewpoint corresponding to a number of touch points, occurring by a user gesture, and a movement direction of the touch point according to an exemplary embodiment.

Referring to FIG. 3, an operation 310 indicates a user gesture to make the virtual object move towards the user, that is, move forwards or to make a camera zoom in, along an X axis. The user may make the virtual object move towards the user along the X axis, or may make the camera zoom in along the X axis by placing two fingers on a virtual manipulation medium and then widening the fingers. In this instance, when the virtual manipulation medium is displayed on the virtual object, a manipulation target may be the virtual object. When the virtual manipulation medium is displayed on a background, the manipulation target may be the camera.

Also, an operation 320 indicates a user gesture to make the virtual object move away from the user, that is, move backwards or to make the camera zoom out, along the X axis. The user may make the virtual object move away from the user along the X axis, or may make the camera zoom out along the X axis by placing two fingers on the virtual manipulation medium and putting together the fingers.

Also, an operation 330 indicates a user gesture to make the virtual object or the camera move to the left along a Y axis. An operation 340 indicates a user gesture to make the virtual object or the camera move to the right along the Y axis.

Also, operations 350 and 360 indicate user gestures to make the virtual object or the camera move up and down, respectively.

Figure 4:
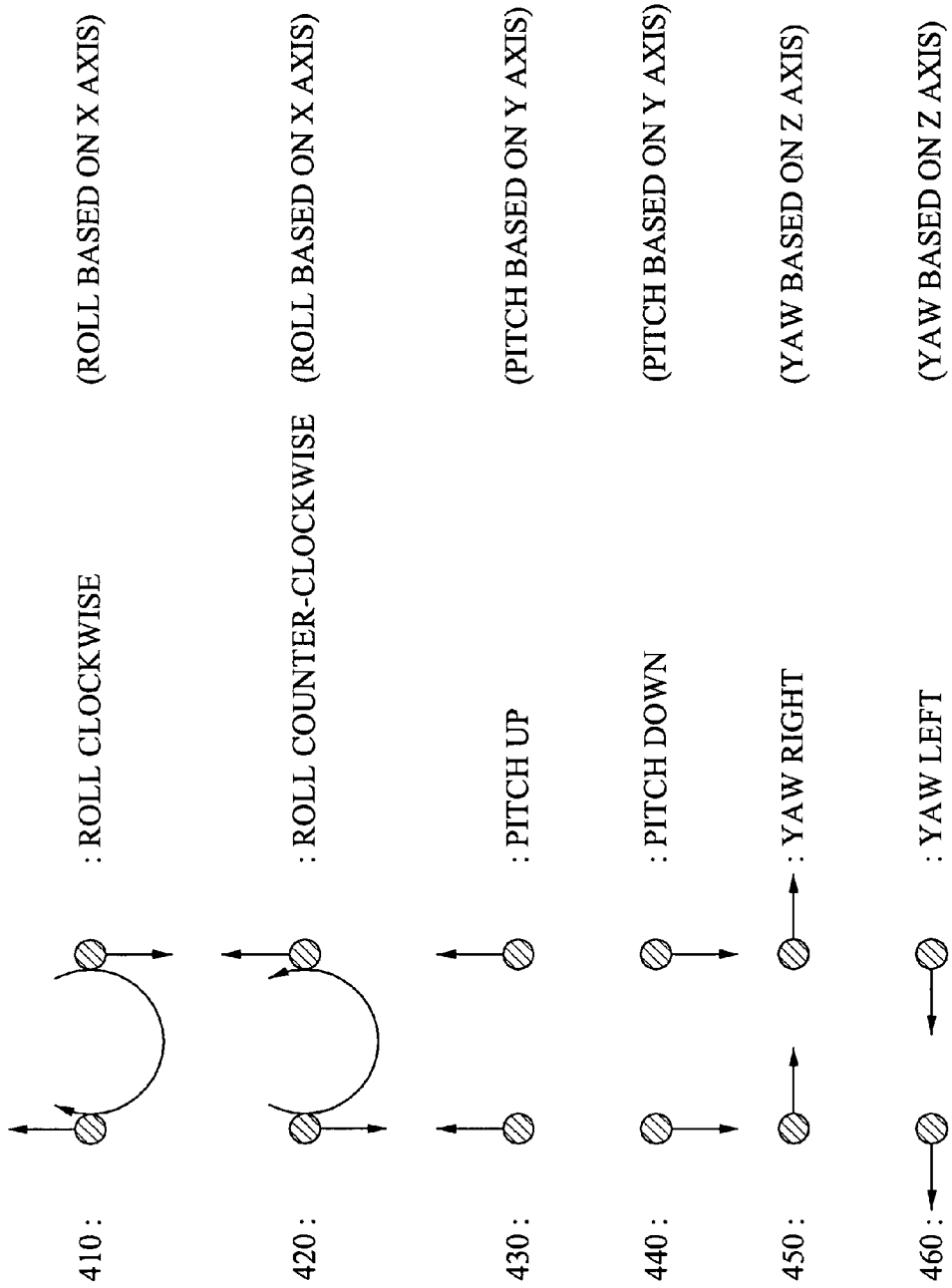
FIG. 4 illustrates a change in a virtual object or a viewpoint corresponding to a number of touch points, occurring due to a user gesture, and a movement direction thereof according to another exemplary embodiment.

FIG. 4 illustrates a change in a virtual object or a viewpoint corresponding to a number of touch points, occurring due to a user gesture, and a movement direction of the touch point according to other exemplary embodiments.

Referring to FIG. 4, operations 410 and 420 indicate user gestures to make the virtual object or a camera roll based on an X axis. Specifically, the operation 410 indicates the user gesture to make the virtual object or the camera roll clockwise based on the X axis, and the operation 420 indicates the user gesture to make the virtual object or the camera roll counterclockwise based on the X axis.

Also, operations 430 and 440 indicate user gestures to make the virtual object or the camera pitch up and down based on a Y axis, respectively. Operations 450 and 460 indicate user gestures to make the virtual object or the camera yaw to the right and to the left, respectively.

Referring to FIGS. 3 and 4, according to an exemplary embodiment, 6DOF may be provided with respect to each of the virtual object and the viewpoint of the user. Specifically, the user may execute at least one of the movement along the X axis, the movement along the Y axis, the movement along the Z axis, the roll based on the X axis, the pitch based on the Y axis, and the yaw based on the Z axis with respect to each of the virtual point and the viewpoint by exhibiting a particular gesture. Accordingly, a total of 12DOF may be supported with respect to the virtual object and the viewpoint of the user.

Figure 5:
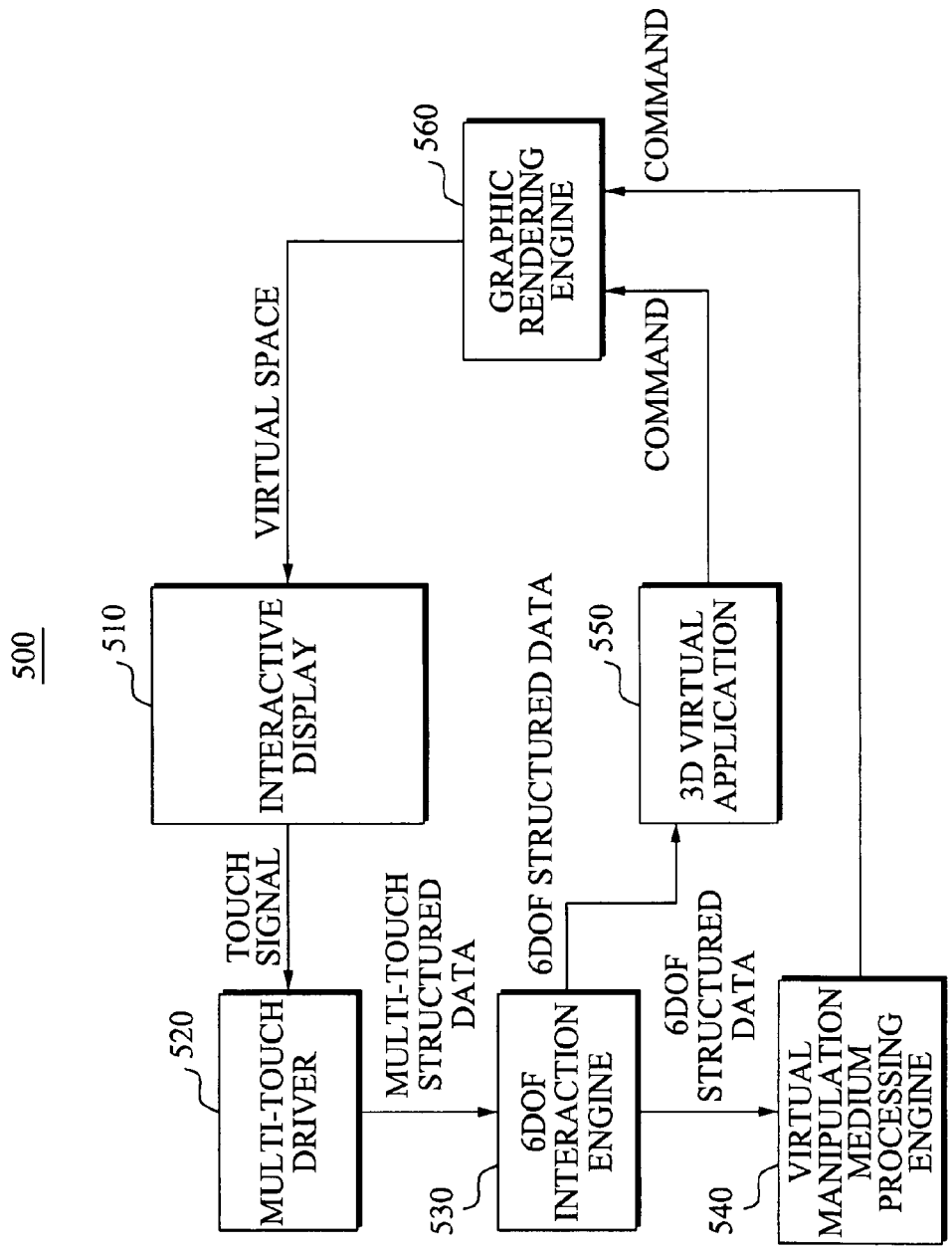
FIG. 5 is a block diagram illustrating a concept of a computing system according to an exemplary embodiment.

FIG. 5 is a block diagram illustrating a concept of a computing system 500 according to an exemplary embodiment.

Referring to FIG. 5, the computing system 500 may include an interactive display 510, a multi-touch driver 520, a 6DOF interaction engine 530, a virtual manipulation medium processing engine 540, a 3D virtual application 550, and a graphic rendering engine 560.

A background and a virtual object may be displayed on the interactive display 510. The interactive display 510 may include a multi-touch sensor capable of recognizing multiple touches of a user. The user may manipulate the virtual object or a viewpoint of the user by directly touching the interactive display 510.

Also, the multi-touch driver 520 may generate multi-touch structured data based on a touch signal that occurs when the user touches the interactive display 510. The multi-touch structured data may indicate locations of touch points.

Also, the 6DOF interaction engine 530 may receive the multi-touch structured data from the multi-touch driver 520. The 6DOF interaction engine 530 may analyze the multi-touch structured data to thereby generate 6DOF structured data that may be used to verify a user gesture. Here, the 6DOF structured data may include information associated with a movement direction along each of an X axis, a Y axis, and a Z axis, and a rotation angle with respect to each of the X axis, the Y axis, and the Z axis.

Also, the virtual manipulation medium processing engine 540 may generate a command for applying a video effect and an audio effect to a virtual manipulation medium to correspond to the user gesture, using the 6DOF structured data. For example, the virtual manipulation medium processing engine 540 may generate a command for performing a graphic/audio process according to a movement of the virtual manipulation medium, or a command for variously applying the size, a color, etc., of the virtual manipulation medium.

Also, the 3D virtual application 550 may generate a command for performing a graphic process according to a motion of the virtual object, or according to a movement of a camera, using the 6DOF structured data.

Also, the commands of the virtual manipulation medium processing engine 540 and the 3D virtual application 550 may be provided to the graphic rendering engine 560. The graphic rendering engine 560 may perform a graphic process corresponding to the user's manipulation on the virtual object or the camera. Also, a virtual 3D space generated by the graphic rendering engine 560 may be provided to the interactive display 510.

Figure 6:
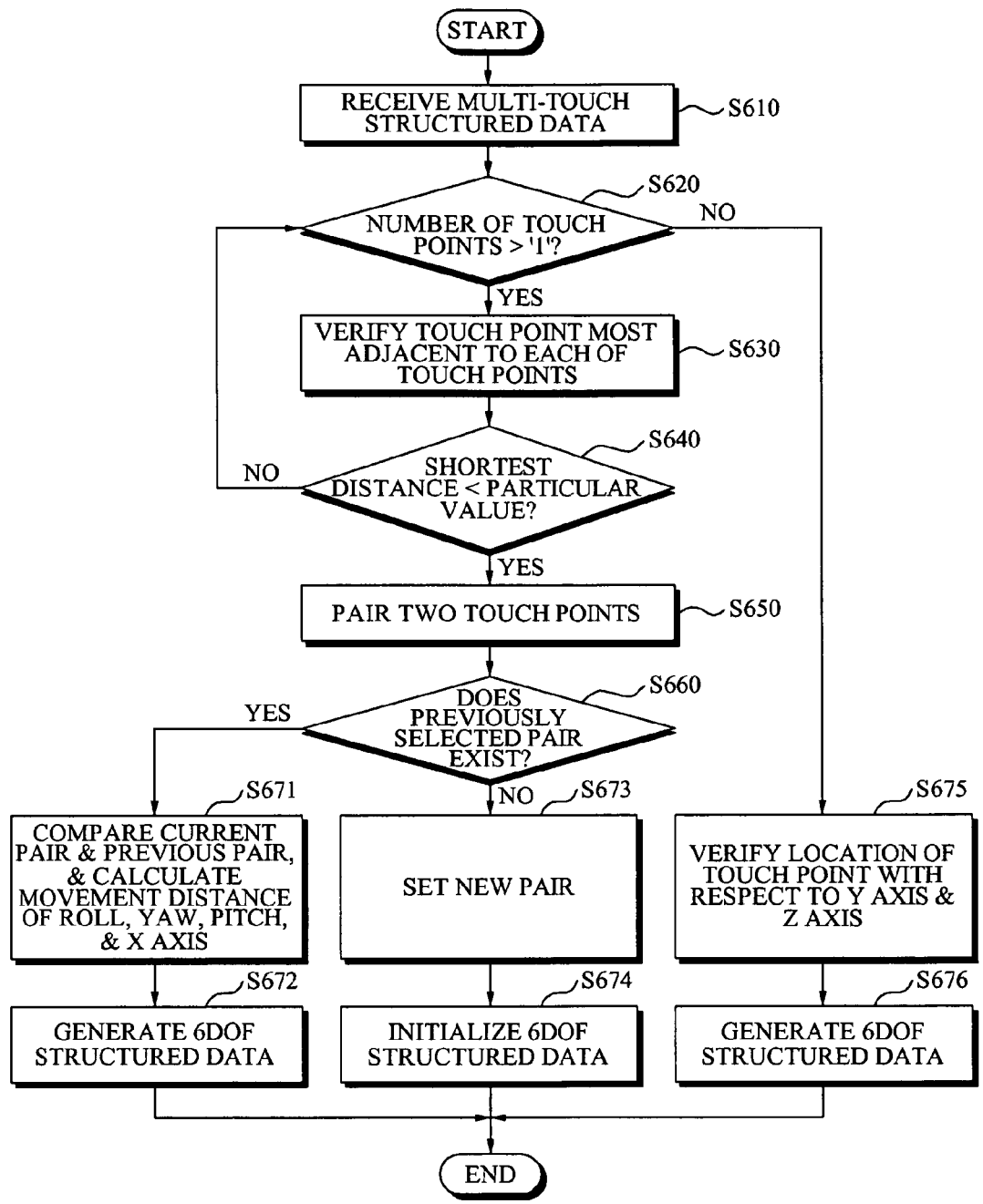
FIG. 6 is a flowchart illustrating a method of operating a 6DOF interaction engine according to an exemplary embodiment.

FIG. 6 is a flowchart illustrating a method of operating a 6DOF interaction engine according to an exemplary embodiment.

Referring to FIG. 6, in operation S610, the 6DOF interaction engine may receive multi-touch 4structured data.

In operation S620, the 6DOF interaction engine may verify a number of touch points based on the multi-touch structured data, and determine whether the number of touch points is greater than '1'.

When the number of touch points is '1', the 6DOF interaction engine may verify a location of the touch point with respect to a Y axis and a Z axis in operation S675, and may generate 6DOF structured data based on the location of the touch point in operation S676.

Conversely, when the number of touch points is at least two, the 6DOF interaction engine may verify a touch point most adjacent to each of the at least two touch points in operation S630.

In operation S640, the 6DOF interaction engine may determine whether a shortest distance among distances from the at least two touch points to corresponding most adjacent touch points is less than a predetermined particular value.

When the shortest distance is less than the particular value, the 6DOF interaction engine may pair touch points corresponding to the shortest distance in operation S650.

In operation S660, the 6DOF interaction engine may determine whether a previously selected pair exists.

When the previously selected pair exists, the 6DOF interaction engine may compare a current pair with the previously selected pair and calculate a movement distance associated with each of roll, yaw, and pitch, and a movement distance along the X axis in operation S671.

In operation S672, the 6DOF interaction engine may generate 6DOF structured data using the calculation result of operation S671.

Conversely, when the previously selected pair does not exist in operation S660, the 6DOF interaction engine may set, as a new pair, the pair selected in operation S650, in operation S673. In operation S674, the 6DOF interaction engine may initialize the 6DOF structured data.

Figure 7:
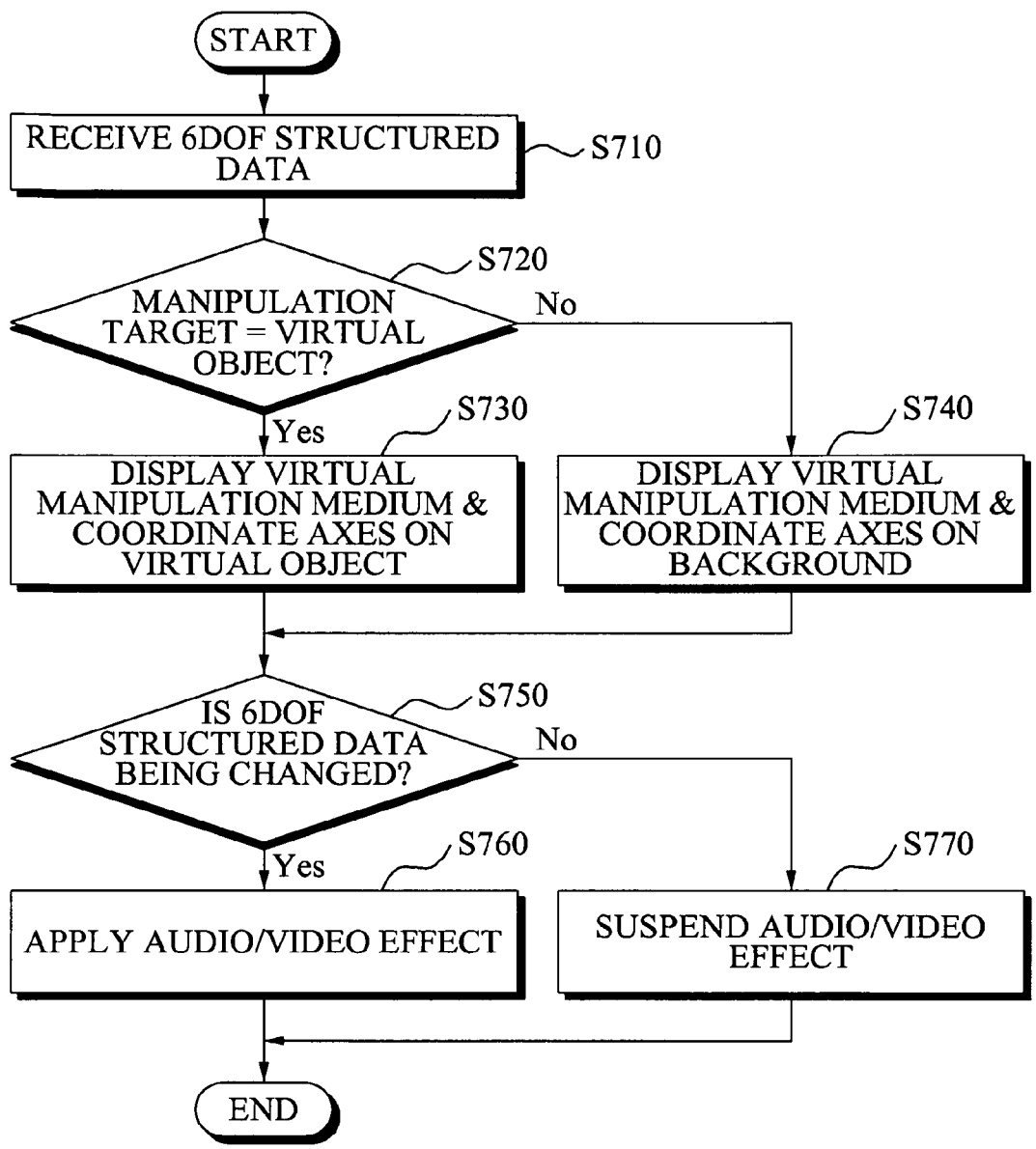
FIG. 7 is a flowchart illustrating a method of operating a virtual manipulation medium processing engine according to an exemplary embodiment.

FIG. 7 is a flowchart illustrating a method of operating a virtual manipulation medium processing engine according to an exemplary embodiment.

Referring to FIG. 7, in operation S710, the virtual manipulation medium processing engine may receive 6DOF structured data. Here, the 6DOF structured data may include information associated with a movement distance of a virtual object or a camera along each of an X axis, a Y axis, and a Z axis according to a user gesture, and a rotation angle of the virtual object or the camera with respect to each of the X axis, the Y axis, and the Z axis.

In operation S720, the virtual manipulation medium processing engine may determine whether a manipulation target is the virtual object based on a location of a touch point. Specifically, when the touch point exists on the virtual object, the virtual manipulation medium processing engine may determine the manipulation target as the virtual object. When the touch point exists on a background excluding the virtual object, the virtual manipulation medium processing engine may determine the manipulation target as the camera. Here, the camera may correspond to a viewpoint of the user.

When the manipulation target is the virtual object in operation 720, the virtual manipulation medium processing engine may display a virtual manipulation medium and coordinate axes for a user convenience on the virtual object in operation S730.

When the manipulation target is not the virtual object in operation 720, the virtual manipulation medium processing engine may display a virtual manipulation medium and coordinate axes for a user convenience on the background in operation S740.

In operation S750, the virtual manipulation medium processing engine may verify whether the 6DOF structured data is being changed. When the 6DOF structured data is being changed, it may indicate that the user gesture is being continuously performed. Conversely, when the 6DOF structured data is not being changed, it may indicate that the user gesture is suspended in operation 770.

Also, when the 6DOF structured data is being changed, the virtual manipulation medium processing engine may generate a command for applying a video effect and an audio effect and thereby enhance a 3D effect in operation S760. Conversely, when the 6DOF structured data is not being changed, the virtual manipulation medium processing engine may generate a command for suspending the video effect and the audio effect.

Also, when the manipulation target is the camera in operation S720, the virtual manipulation medium processing engine may display the virtual manipulation medium and the coordinate axes on the background.

Figure 8:
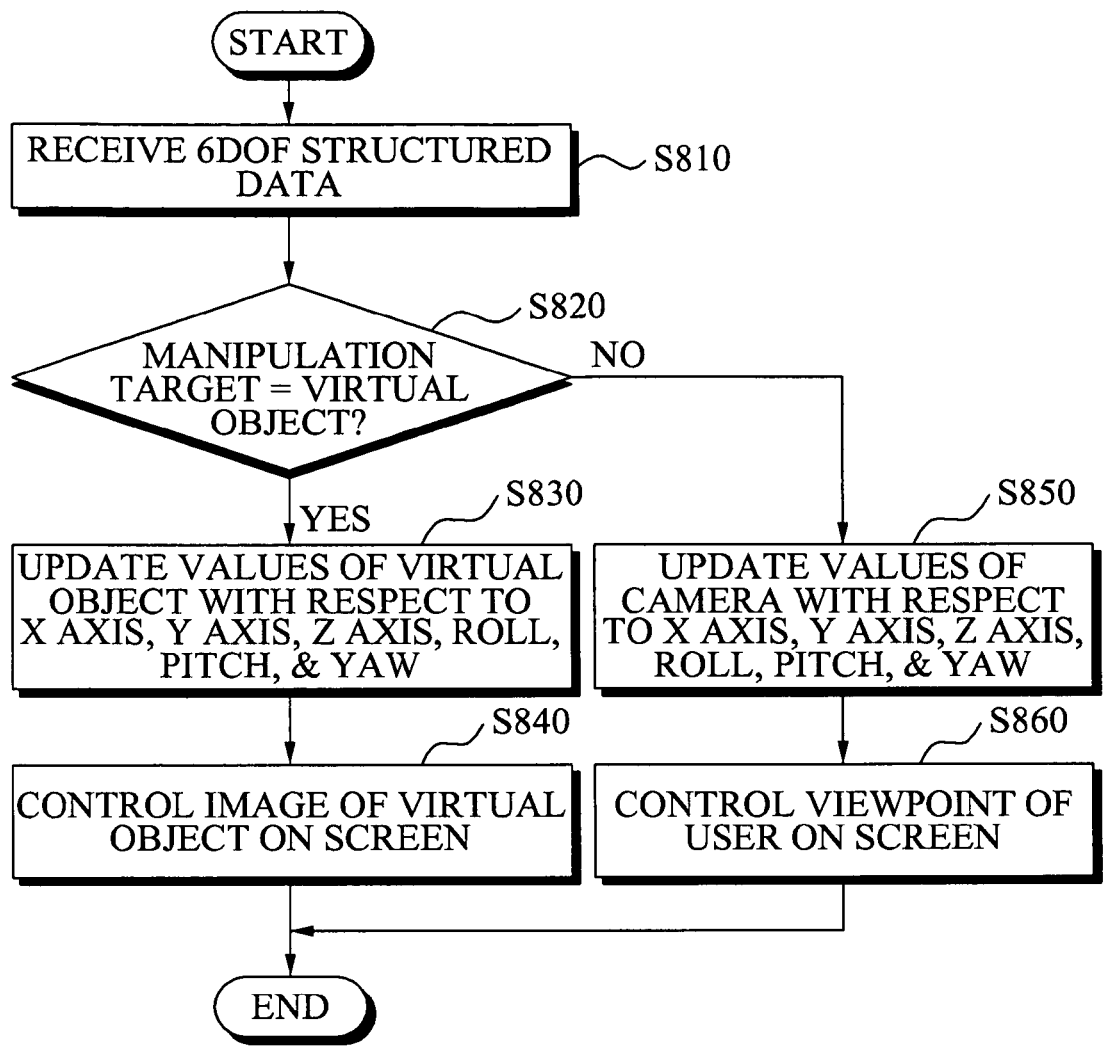
FIG. 8 is a flowchart illustrating a method of operating a three-dimensional (3D) virtual application according to an exemplary embodiment.

FIG. 8 is a flowchart illustrating a method of operating a 3D virtual application according to an exemplary embodiment.

Referring to FIG. 3, in operation S810, the 3D virtual application may receive 6DOF structured data.

In operation S820, the 3D virtual application may determine whether a manipulation target is a virtual object based on a location of a touch point.

When the manipulation target is the virtual object, the 3D virtual application may update values of the virtual object with respect to an X axis, a Y axis, a Z axis, roll, pitch, and yaw based on the 6DOF structured data, in operation S830.

In operation S840, the 3D virtual application may provide the updated values to a graphic rendering engine, and thereby control an image of the virtual object on a screen.

Conversely, when the manipulation target is a camera, the 3D virtual application may update values of the camera with respect to the X axis, the Y axis, the Z axis, roll, pitch, and yaw based on the 6DOF structured data, in operation S850.

In operation S860, the 3D virtual application may provide the updated values to the graphic rendering engine, and thereby control a viewpoint of a user on the screen.

The above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be stored in a plurality of storage devices (e.g. magnetic media, optical media, magneto-optical media and other hardware devices) as part of a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order toperform the operations of the above-described exemplary embodiments, or vice versa.

According to exemplary embodiments, there may be provided a technology that may control a virtual object or a viewpoint on a screen using at least 6DOF structured data.

Also, according to exemplary embodiments, there may be provided a technology that may convert, to 6DOF structured data, a user input according to simple gestures of a user.

Also, according to exemplary embodiments, it is possible to provide a user with an intuitive interface technology using a multi-touch technology.

Also, according to exemplary embodiments, a user may control a virtual object or a viewpoint using a single hand.

Also, according to exemplary embodiments, there may be provided a technology that enables a user to more conveniently select any one of a manipulation on a virtual object and a control of a viewpoint.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. A method of controlling a virtual object or a viewpoint of a user on a two-dimensional (2D) interactive display, the method comprising:
    verifying, when a number of touch points by a user input is at least two, two touch points most adjacent to each other among the at least two touch points;
    determining whether a distance between the verified two touch points is less than a predetermined value;
    pairing the verified two touch points when the distance between the verified two touch points is less than the predetermined value;
    converting the user input to at least 6 degrees of freedom (DOF) structured data according to at least one of a movement direction of the paired touch points and a rotation direction of the paired touch points; and
    controlling a manipulation target using the at least 6DOF structured data.

2. The method of claim 1, wherein the at least 6DOF comprises a movement along an X axis, a movement along a Y axis, a movement along a Z axis, a roll based on the X axis, a pitch based on the Y axis, and a yaw based on the Z axis, in a three-dimensional (3D) space comprising the X axis, the Y axis, and the Z axis.

3. The method of claim 1, wherein the converting of the user input comprises comparing the number of the touch points with a predetermined particular value to convert the user input to the at least 6DOF structured data.

4. The method of claim 1, wherein, when the number of the touch points is at least two, the converting of the user input comprises pairing the at least two touch points and converting the user input to the at least 6DOF structured data according to a movement direction of the paired at least two touch points and a rotation direction thereof.

5. The method of claim 1, wherein the controlling of the manipulation target comprises applying a video effect or an audio effect to the manipulation target that is any one of the virtual object and the viewpoint of the user.

6. The method of claim 1, further comprising:
    displaying a virtual manipulation medium as a user interface to manipulate the virtual object, displayed on a screen, or the viewpoint of the user, wherein the virtual manipulation medium is displayed in a region including the virtual object when the virtual object is determined as the manipulation target, and the virtual manipulation medium is displayed in a region excluding the virtual object when the viewpoint of the user is determined as the manipulation target.

7. The method of claim 6, wherein, when the number of the touch points is two, the displayed virtual manipulation medium has a spherical form which has a diameter which is determined by a distance between two fingers, and the displayed virtual medium includes display of three-dimensional (3D) coordinate axes.

8. A non-transitory computer-readable recording media storing program instructions to control at least one processor to implement the method of claim 1.

9. The method of claim 1, wherein:
    the at least 6DOF comprises a movement along an X axis, a movement along a Y axis, a movement along a Z axis, a roll based on the X axis, a pitch based on the Y axis, and a yaw based on the Z axis, in a three-dimensional (3D) space comprising the X axis, the Y axis, and the Z axis; and
    when the number of touch points is at least two, the converting of the user input comprises pairing the at least two touch points and converting the user input to the at least 6DOF structured data according to at least one of a movement direction of the paired at least two touch points and a rotation direction thereof to provide movement along the X-axis, movement along the Y-axis, movement along the Z-axis, roll, pitch, and yaw.

10. The method of claim 1, further comprising:
    determining, as the manipulation target, any one of the virtual object and the viewpoint of the user, based on the touch points,
    wherein the virtual object is determined as the manipulation target when a location of the touch points exists in a region including the virtual object, and the viewpoint of the user is determined as the manipulation target when the location of the touch points exists in a region excluding the virtual object.

11. A method of processing multi-touch structured data, the method comprising:
    receiving, from a multi-touch driver, the multi-touch structured data that is associated with a user input via a virtual manipulation medium;

extracting, from the multi-touch structured data, a number of touch points, a movement direction thereof, a location thereof, and a rotation direction thereof;

verifying, when the number of touch points is at least two, two touch points most adjacent to each other among the at least two touch points;

determining whether a distance between the verified two touch points is less than a predetermined value;

pairing the verified two touch points when the distance between the verified two touch points is less than the predetermined value; and converting the multi-touch structured data to at least 6 degrees of freedom (6DOF) structured data, based on at least one of a movement direction of the paired touch points and a rotation direction of the paired touch points.

12. The method of claim 11, wherein the converting of the multi-touch structured data comprises comparing the number of touch points with a predetermined particular value to convert the multi-touch structured data to the at least 6DOF structured data.

13. The method of claim 8, wherein the at least 6DOF comprises a movement along an X axis, a movement along a Y axis, a movement along a Z axis, a roll based on the X axis, a pitch based on the Y axis, and a yaw based on the Z axis, in a 3D space comprising of the X axis, the Y axis, and the Z axis.

14. A non-transitory computer-readable recording media storing program instructions to control at least one processor to implement the method of claim 11.

15. A method of processing a virtual manipulation medium that is used to control a virtual object or a viewpoint of a user on an interactive display, the method comprising:

receiving, from a user input via the virtual manipulation medium, at least 6 degrees of freedom (6DOF) structured data, wherein the at least 6DOF structured data is generated based on a number of touch points, a movement direction thereof, a location thereof, and a rotation direction thereof;

determining, as a manipulation target, any one of the virtual object, displayed on a screen, and the viewpoint of the user, based on the location of the touch point, wherein the virtual object is determined as the manipulation target when a location of the touch points exists in a region including the virtual object, and the viewpoint of the user is determined as the manipulation target when the location of the touch points exists in a region excluding the virtual object;

displaying, as a user interface, the virtual manipulation medium in any one of a region including the virtual object and a region excluding the virtual object, depending on whether the virtual object is determined as the manipulation target or the viewpoint of the user is determined as the manipulation target; and applying a video effect or an audio effect to the manipulation target that is any one of the virtual object and the viewpoint of the user.

16. The method of claim 15, wherein the at least 6DOF comprises a movement along an X axis, a movement along a Y axis, a movement along a Z axis, a roll based on the X axis, a pitch based on the Y axis, and a yaw based on the Z axis, in a 3D space comprising the X axis, the Y axis, and the Z axis.

17. The method of claim 15, wherein, when the number of touch points is two, the displayed virtual manipulation medium has a spherical form which has a diameter which is determined by a distance between two fingers, and the displayed virtual medium includes display of three-dimensional (3D) coordinate axes.

18. A non-transitory computer-readable recording media storing program instructions to control at least one processor to implement the method of claim 15.

19. A computing system for controlling a virtual object or a viewpoint of a user on a two-dimensional (2D) interactive display, the system comprising:

a multi-touch sensor to recognize one or more touches of the user and to generate one or more touch signals, wherein a virtual manipulation medium is displayed on the interactive display after the multi-touch sensor recognizes the one or more touches;

a multi-touch driver, using at least one processor, to generate multi-touch structured data based on one or more touch signals received from the multi-touch sensor;

a six degree of freedom interaction engine to receive the multi-touch structured data from the multi-touch driver and to generate six degrees of freedom structured data;

a virtual manipulation medium processing engine to generate a command to apply at least one of a video effect and an audio effect to the virtual manipulation medium to correspond to a user gesture using the six degrees of freedom structured data; and a three-dimensional virtual application to generate a command to perform a graphic process according to motion of the virtual object or according to a movement of a camera, using the six degrees of freedom structured data, wherein, when the number of touches is two, the displayed virtual manipulation medium has a spherical form which has a diameter which is determined by a distance between two fingers, and the displayed virtual medium includes display of three-dimensional (3D) coordinate axes.

\* \* \* \* \*

UNITED STATES PATENT AND TRADEMARK OFFICE
CERTIFICATE OF CORRECTION

| | | |
|---|---|---|
| PATENT NO. | : 8,839,136 B2 | Page 1 of 1 |
| APPLICATION NO. | : 12/453352 | |
| DATED | : September 16, 2014 | |
| INVENTOR(S) | : Byung In Yoo et al. | |

It is certified that error appears in the above-identified patent and that said Letters Patent is hereby corrected as shown below:

In the Claims

Column 9, Line 21, In Claim 13, delete "claim 8," and insert -- claim 11, --, therefor.

Column 9, Line 25, In Claim 13, after "comprising" delete "of".

Signed and Sealed this
Twenty-third Day of December, 2014

Michelle K. Lee
*Deputy Director of the United States Patent and Trademark Office*